United States Patent
Diergardt

(10) Patent No.: US 7,984,874 B2
(45) Date of Patent: Jul. 26, 2011

(54) FLEXIBLE CABLE CONNECTION TO MONUMENTS INSIDE OF AN AIRCRAFT CABIN

(75) Inventor: Daniel Diergardt, Hamburg (DE)

(73) Assignee: Airbus Deutschland GmbH (DE)

( * ) Notice: Subject to any disclaimer, the term of this patent is extended or adjusted under 35 U.S.C. 154(b) by 755 days.

(21) Appl. No.: 12/009,820

(22) Filed: Jan. 22, 2008

(65) Prior Publication Data

US 2008/0179456 A1    Jul. 31, 2008

Related U.S. Application Data

(60) Provisional application No. 60/897,674, filed on Jan. 25, 2007.

(30) Foreign Application Priority Data

Jan. 25, 2007   (DE) .......................... 10 2007 003 802

(51) Int. Cl.
B64D 47/00    (2006.01)
(52) U.S. Cl. .................. 244/117 R; 244/118.5; 244/131
(58) Field of Classification Search ............... 244/118.1, 244/118.6, 117 R, 131, 118.5; 174/19, 111, 174/135, 69, 176, 184, 207–208
See application file for complete search history.

(56) References Cited

U.S. PATENT DOCUMENTS

| | | | | |
|---|---|---|---|---|
| 2,975,807 | A * | 3/1961 | Waninger | 174/69 |
| 3,921,388 | A * | 11/1975 | Loos et al. | 174/69 |
| 5,083,727 | A | 1/1992 | Pompei et al. | |
| 6,007,025 | A * | 12/1999 | Coughren et al. | 244/118.6 |
| 6,781,058 | B1 * | 8/2004 | DeCicco et al. | 174/69 |
| 7,677,499 | B2 * | 3/2010 | Weaver | 174/69 |
| 2004/0000422 | A1 * | 1/2004 | Tsutsumi et al. | 174/135 |
| 2007/0163795 | A1 * | 7/2007 | Utaki et al. | 174/19 |

FOREIGN PATENT DOCUMENTS

DE  10 2005 007 058 A1   8/2006
DE  10 2004 062 470 A1   11/2006

* cited by examiner

*Primary Examiner* — Galen Barefoot
(74) *Attorney, Agent, or Firm* — Lerner, David, Littenberg, Krumholz & Mentlik, LLP

(57) ABSTRACT

A flexible cable connection for connecting the monuments to an on-board supply device, which cable connection ensures that displacement of the monument in longitudinal direction of the aircraft becomes possible without disconnecting the connection cable, and the required distance between the connection routes is maintained even during displacement. To this effect, the cable connection comprises a chain device for guiding the connection cable.

13 Claims, 3 Drawing Sheets

FLEXIBLE CABLE CONNECTION TO MONUMENTS INSIDE OF AN AIRCRAFT CABIN

CROSS-REFERENCE TO RELATED APPLICATIONS

This application claims the benefit of the filing date of U.S. Provisional Patent Application No. 60/897,674 filed Jan. 25, 2007, the disclosure of which is hereby incorporated herein by reference.

FIELD OF THE INVENTION

The present invention relates to cable connections in aircraft. In particular the present invention relates to a flexible cable connection for electrically connecting a monument to a supply device in an aircraft; to a monument for an aircraft comprising such a cable connection; to an aircraft and to the use of a cable connection in an aircraft.

BACKGROUND OF THE INVENTION

Within an aircraft cabin increasingly greater flexibility is required, i.e. airlines would like to be able to change the cabin layout in the shortest time possible. There is a resulting demand for the monuments, e.g. galleys or lavatories, to be able to be displaced within the cabin in the direction of flight. At present such displacement may require separation of the electrical connection of the monuments from the on-board supply.

At present the monuments with cables from the "monument roof" may be connected to the aircraft structure and to a central supply device. If the monuments are to be repositioned, new cable routing may be required on the side of the aircraft structure, for example because the cables used are too short or are no longer correctly spaced apart from each other. For electrically connecting the monuments, after displacement, new holders, cable ties and possibly new cables may be required. Route separation may not be ensured in every case.

SUMMARY OF THE INVENTION

According to an exemplary embodiment of the present invention, a flexible cable connection for the electrical connection of a monument to a supply device in an aircraft is stated, wherein the flexible cable connection comprises a first connection cable for connecting the monument to the supply device, and a chain device for guiding the connection cable such that displacement of the monument in longitudinal direction of the aircraft may become possible without disconnecting the connection cable.

In other words, the flexible (e.g. electrical) cable connection may be able to ensure a connection of the monument to a central energy supply device or to a central control-/regulating line that is characterised in that displacement of the monument in the direction of flight or opposite to the direction of flight may be possible without the need to disconnect the connection of the monument to the supply device. In this way the monuments may quickly and effortlessly be slid to or fro, without this requiring any intervention in the cable structure. In this process there may be no need to disconnect any connectors or cable ties.

Thus, displacement of the monuments in the direction of flight may be possible without this requiring any change to the electrical installation.

Furthermore, this may provide a flexible electrical connection of monuments to a supply line of an aircraft. According to a further exemplary embodiment of the present invention, the first connection cable forms part of a route, wherein cable connection is designed such that a required distance between the first route and a second route of the monument during displacement of the monument is maintained.

In other words, the required route distances between the various connection routes in relation to each other are maintained at any point in time. In this way route separation is maintained. Rearrangement or reconfiguration of the connection routes after displacement of the monument is not required because the cable connection automatically ensures that the required minimum distances and cable alignments are maintained at all times.

According to a further exemplary embodiment of the present invention, the chain device comprises a first region that is affixed to an aircraft structure of the aircraft. Furthermore, the chain device comprises a second region that is affixed to the monument.

The cable connection may thus be firmly connected to the monument and to the aircraft structure by way of the chain device. In this way the stability of the entire arrangement is enhanced. During displacement of the monument the first region and the second region of the chain device are displaced relative to each other, and the chain device moves, for example, in a caterpillar-like manner along the top of the monument.

According to a further exemplary embodiment of the present invention, the first connection cable is arranged on an inside of the chain device. The cable is thus protected towards the outside by the chain. During the caterpillar-like unrolling of the chain at the top of the monument, the first connection cable is taken along by the chain. Due to the guidance of the connection cable by the chain device there is no displacement of the connection cable across the direction of flight.

According to a further exemplary embodiment of the present invention, the cable connection further comprises a second connection cable for connecting the monument to the supply device, wherein the cable connection is designed such that a required distance between the first connection cable and the second connection cable is maintained during displacement of the monument.

In this manner the required route distances may be maintained at any time. With a correspondingly wide embodiment of the chain device it is thus possible to connect several connection cables or connection routes to the chain and to have them guided by the chain. There is no need to use several chain devices.

According to a further exemplary embodiment of the present invention, the supply device comprises a supply line in the aircraft fuselage. For example, the supply device is a central supply device that provides the electrical energy for the monument. Furthermore, the supply device can comprise control—or regulating lines by way of which control—or regulating signals can be transmitted to the monument, or in-flight entertainment lines for the transmission of data to electronic entertainment units for passengers. Furthermore, the supply device can comprise hoses or lines through which liquids, for example fresh water or grey water, or gases, for example oxygen or nitrogen, may be conveyed.

According to a further exemplary embodiment of the present invention, the monument is a lavatory or a galley element or a complete galley.

According to a further exemplary embodiment of the present invention, the monument is a stowage cabinet, which comprises, for example, illumination units or monitors etc.

According to a further exemplary embodiment of the present invention, the monument is a separation element, for example a partition for separating two cabin sections from each other.

According to a further exemplary embodiment of the present invention, the monument is an in-flight entertainment (IFE) device, such as IFE rack for providing an entertainment program for passengers.

According to a further exemplary embodiment of the present invention, the first route comprises a connector element by way of which the first route can be connected to the supply device. During installation of the monument, the connection cable is thus connected to the supply device of the aircraft by means of the connector element. In this way the installation of the monument in the aircraft is facilitated. If at a later point in time displacement of the monument takes place, it may then no longer be necessary to disconnect the connector.

According to a further exemplary embodiment of the present invention, a monument for an aircraft is stated that comprises a cable connection according to the invention. It is thus possible to provide the monument with the flexible cable connection directly at the factory before the monument is installed in the aircraft cabin. According to a further exemplary embodiment of the present invention, the monument is a lavatory or a galley element.

Moreover, according to an exemplary embodiment of the present invention, an aircraft is stated that comprises a cable connection according to the invention.

Furthermore, according to an exemplary embodiment of the present invention, the use of a cable connection in an aircraft is stated.

Below, with reference to the figures, preferred exemplary embodiments of the present invention are described.

DETAILED DESCRIPTION

Figure 1A:
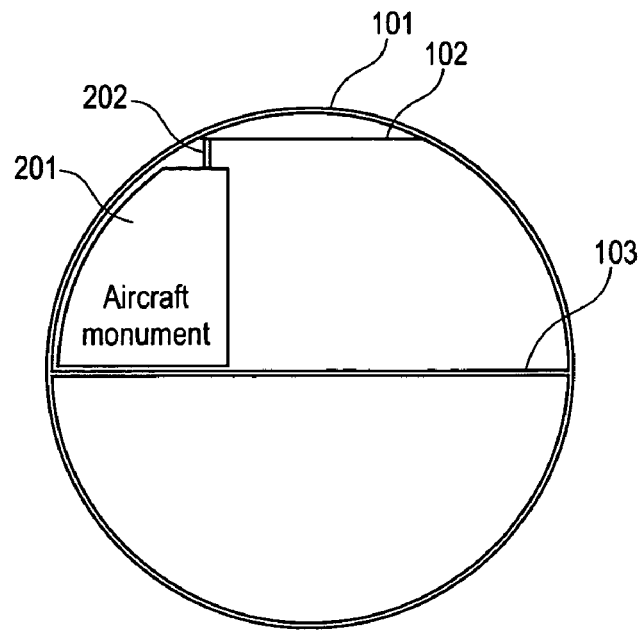
FIG. 1A shows a diagrammatic cross-sectional view of an aircraft fuselage comprising an aircraft monument.

The diagrams in the figures are schematic and not to scale.

In the following description of the figures the same reference characters are used for identical or similar elements.

FIG. 1 shows a diagrammatic cross-sectional view of an aircraft fuselage 101. The fuselage 101 comprises a ceiling structure 102 and a cabin floor 103 on which the aircraft monument 201 is arranged. By way of a connection cable the aircraft monument 201 is connected to the on-board supply device 202. If the monument 201 is to be displaced along the longitudinal axis of the aircraft (in the direction of flight or opposite to the direction of flight), the connection to the on-board supply device 202 has to be disconnected. After the monument 201 has been displaced, the installation of a new, extended or shortened, cable or cable route may be necessary.

Furthermore, it must be ensured that the cable routes are always positioned such that a required route separation is ensured. Displacement of the monument 201 may require an increase in installation effort.

Figure 1B:
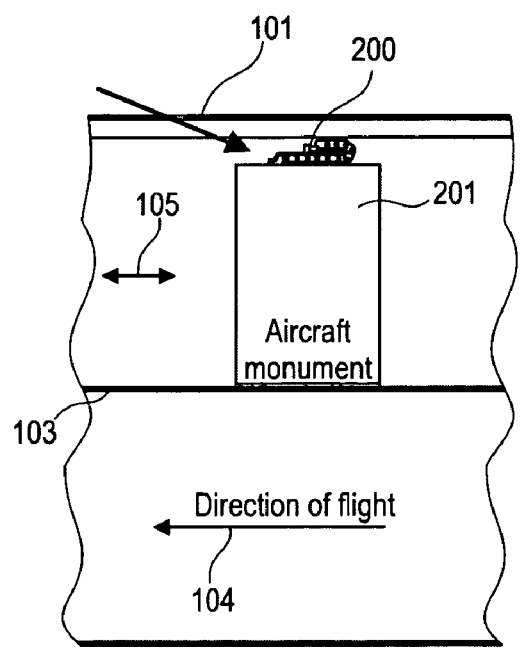
FIG. 1B shows a diagrammatic view of an aircraft fuselage comprising an aircraft monument according to an exemplary embodiment of the present invention.

FIG. 1B shows a longitudinal view of the aircraft fuselage 101 with an aircraft monument 201 that is installed on the floor structure 103. Displacement of the monument 201 in the direction of flight 104 or opposite to the direction of flight 104 (indicated by a double arrow 105) does not require disconnection of connectors or cable ties because the aircraft monument 201 is connected to the on-board supply by way of the flexible cable connection 200. In this way the stringent requirements concerning route separation are met. The various routes by means of which the monuments are connected thus at all times maintain the required minimum distance from each other. By means of the new flexible cable connection it is ensured that route separation is maintained and that no connectors or cable ties have to be disconnected.

Figure 2:
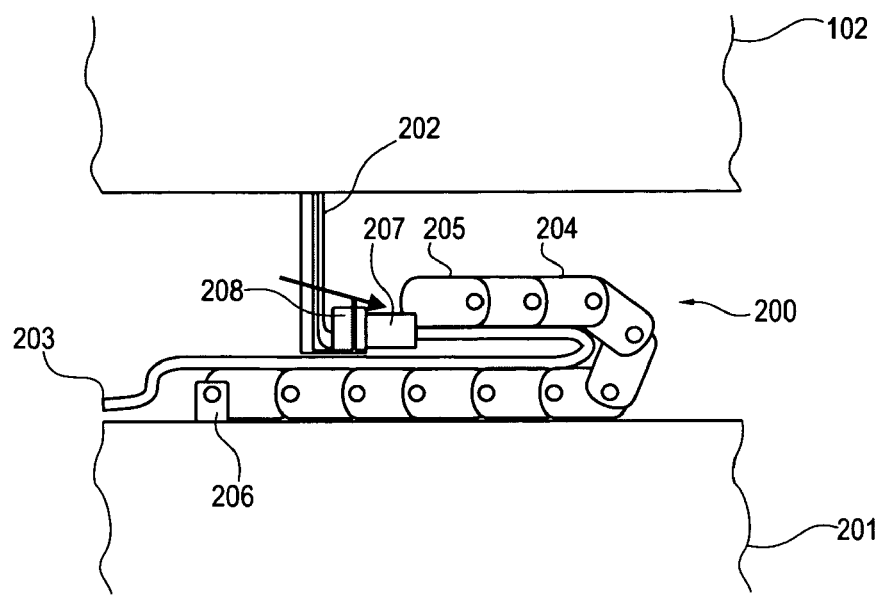
FIG. 2 shows a diagrammatic view of an electrical connection of an aircraft monument to the aircraft structure according to an exemplary embodiment of the present invention.

FIG. 2 shows a diagrammatic detail view of the electrical connection of the aircraft monument 201 to the on-board supply 202. As shown in FIG. 2, the flexible cable connection 200 comprises a chain device 204 that comprises several chain links. In this arrangement the chain device 204 guides the cable, the cable loom or the route 203 on its inside so that the cable, the cable loom or the route 203 are not only protected by the chain device, but also run along a defined fixed path.

The chain device comprises a first region 205 by way of which the chain device is firmly connected to the aircraft structure. Furthermore, the chain device 204 comprises a second region 206 by way of which the chain device is fixed to the monument 201. The cable loom 203 comprises a connector 207 by way of which it can be connected to the supply device 202. To this effect the supply device 202 comprises, for example, a corresponding socket 208.

In this way displacement of the monument 201 in the direction of flight may be possible without there being a need to worry about the route or the connection of the supply cables.

In other words, the electrical connection of the monument 201 takes place by way of cables 203 that are guided by means of the chain 204 and that are connected to the aircraft structure 102 at the top of the monument 201.

Depending on the number of existing routes it is also possible to use several chain devices, or to install the various routes to the same chain device on opposite sides. When the monument 201 is displaced, the chain is displaced while the route distances are maintained. There is no need to disconnect and subsequently reconnect the cable looms.

Figure 3:
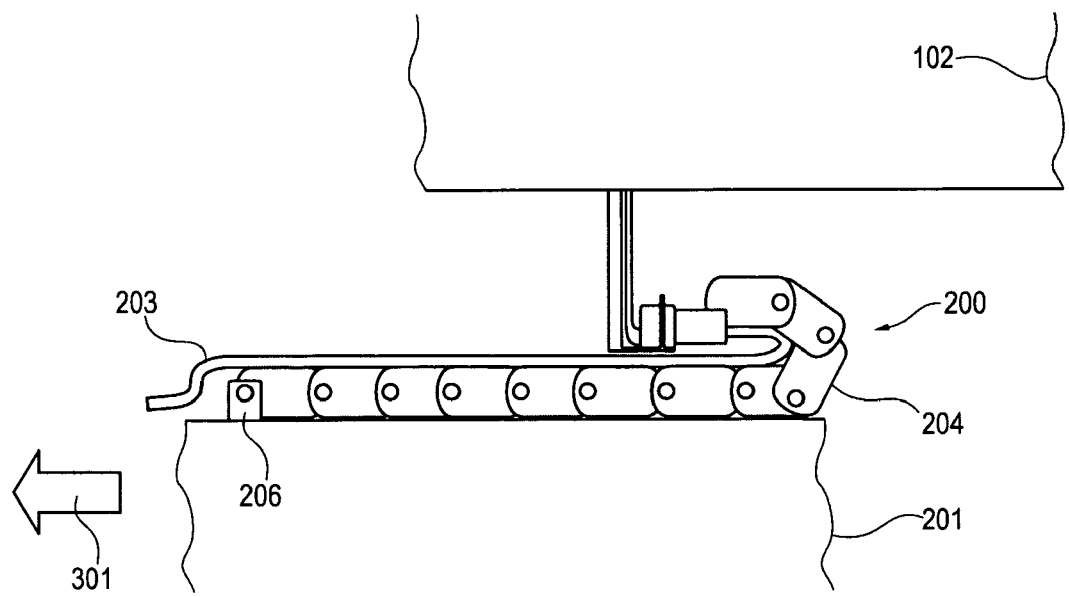
FIG. 3 shows the electrical connection of FIG. 2 during displacement of the monument in the direction of flight.
Figure 4:
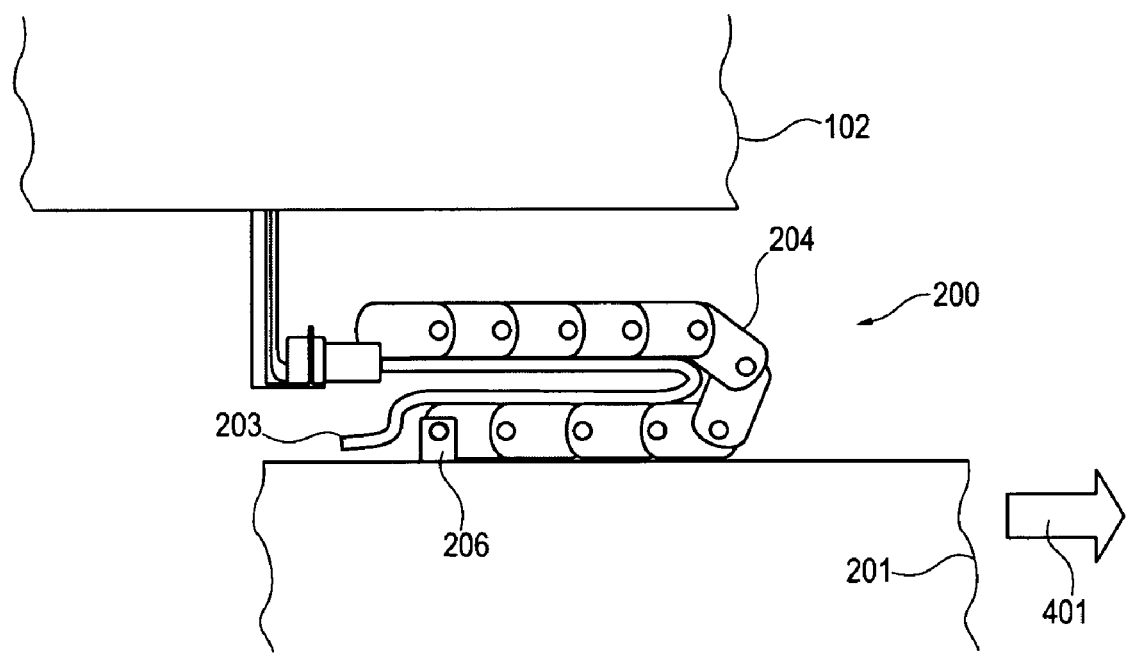
FIG. 4 shows the electrical connection of FIG. 2 during displacement of the monument opposite to the direction of flight.

FIGS. 3 and 4 show such a displacement of the monument 201 in the direction of flight 301, and opposite to the direction of flight 401. In the case of displacement of the monument 201 in the direction of flight 301 the second region 206 of the chain device 204, which region is fastened to the monument, moves with the monument 201. In this process the chain 204 unrolls in a caterpillar-like manner on the top of the monument 201. The cable loom 203 is unrolled together with the chain. This may prevent the cable loom 203 from being able to move across the direction of flight.

In contrast to the above, if the monument 201 is displaced opposite to the direction of flight 401, the fastening region 206 moves along with the monument in the direction of the arrow 401, and the chain 204 is unrolled from the top of the monument 201, thus taking the cable 203 along with it. In this way "excess" cable 203 can be stored without this requiring new cabling or without this compromising route separation.

Deinstallation of cabling is not necessary. Displacement of any monuments does not require the services of an electrician. This results in time saving during displacement of the monuments because no new cabling is required. Route separation is maintained in each case. Since during displacement of the monuments no mechanical intervention in the cabling is required it eliminates the danger of loss of any small parts such as cable ties, screws or the like, or of such parts being forgotten during reinstallation.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. An aircraft comprising:
 a fuselage with a ceiling structure and a cabin floor;
 a monument arranged on the cabin floor;
 an on-board supply device with a socket, the on-board supply device being fixed to the ceiling structure of the fuselage;
 the monument comprising a flexible cable connection electrically connecting the monument to the supply device with the flexible cable connection comprising:
 a first connection cable with a connector releasably connecting the monument to the supply device socket; and
 a chain device for guiding the connection cable such that a displacement of the monument in a longitudinal direction of the aircraft becomes possible without disconnecting the connection cable.

2. The aircraft of claim 1,
 wherein the first connection cable forms part of a first route; and
 wherein the cable connection is designed such that a required distance between the first route and a second route of the monument during displacement of the monument is maintained.

3. The aircraft of claim 1,
 wherein the chain device comprises a first region that is affixed to an aircraft structure of the aircraft; and
 wherein the chain device comprises a second region that is affixed to the monument.

4. The aircraft of claim 3, wherein the first connection cable is arranged on an inside of the chain device.

5. The aircraft of claim 1, further comprising:
 a second connection cable for connecting the monument to the supply device; and
 wherein the cable connection is designed such that a required distance between the first connection cable and the second connection cable is maintained during displacement of the monument.

6. The aircraft of claim 1, wherein the supply device comprises a supply line in the aircraft fuselage.

7. The aircraft of claim 1, wherein the monument is a lavatory.

8. The aircraft of claim 1, wherein the monument is a galley element.

9. The aircraft of claim 1, wherein the monument is a stowage cabinet.

10. The aircraft of claim 1, wherein the monument is a separation element.

11. The aircraft of claim 1, wherein the monument is an in-flight entertainment device.

12. The aircraft of claim 2, wherein the first route comprises a connector element by way of which the first route can be connected to the supply device.

13. The aircraft of claim 1, wherein the monument is a lavatory or a galley element.

* * * * *